(12) United States Patent
Choi et al.

(10) Patent No.: US 12,401,097 B2
(45) Date of Patent: Aug. 26, 2025

(54) COLLECTOR AND CYLINDRICAL SECONDARY BATTERY INCLUDING THE SAME

(71) Applicant: LG ENERGY SOLUTION, LTD., Seoul (KR)

(72) Inventors: Su Ji Choi, Daejeon (KR); Kwang Su Hwangbo, Daejeon (KR); Do Gyun Kim, Daejeon (KR); Min Ki Jo, Daejeon (KR); Kwang Hun Ko, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/724,237

(22) PCT Filed: Jan. 25, 2023

(86) PCT No.: PCT/KR2023/001142
§ 371 (c)(1),
(2) Date: Dec. 30, 2024

(87) PCT Pub. No.: WO2023/146275
PCT Pub. Date: Aug. 3, 2023

(65) Prior Publication Data
US 2025/0125500 A1    Apr. 17, 2025

(30) Foreign Application Priority Data

Jan. 25, 2022    (KR) .................. 10-2022-0010936

(51) Int. Cl.
*H01M 50/533*    (2021.01)
*H01M 50/107*    (2021.01)
(Continued)

(52) U.S. Cl.
CPC ....... *H01M 50/533* (2021.01); *H01M 50/107* (2021.01); *H01M 50/179* (2021.01);
(Continued)

(58) Field of Classification Search
CPC ......... H01M 10/0422; H01M 10/0431; H01M 2200/103; H01M 50/107; H01M 50/179;
(Continued)

(56) References Cited

U.S. PATENT DOCUMENTS

2002/0110729 A1    8/2002 Hozumi et al.
2009/0011329 A1    1/2009 Yoon
(Continued)

FOREIGN PATENT DOCUMENTS

CN    102332543 A    1/2012
JP    11-135151 A    5/1999
(Continued)

OTHER PUBLICATIONS

International Search Report (PCT/ISA/210) issued in PCT/KR2023/001142, dated Apr. 24, 2023.
(Continued)

*Primary Examiner* — Lingwen R Zeng
(74) *Attorney, Agent, or Firm* — Birch, Stewart, Kolasch & Birch, LLP

(57) ABSTRACT

A cylindrical secondary battery includes an electrode assembly provided with an electrode tab; a battery can configured to accommodate the electrode assembly; a terminal configured to pass through the battery can and insulated from the battery can; and a collector configured to electrically connect the electrode tab to the terminal. The collector may include an edge part; a terminal coupling part disposed inside the edge part and coupled to the terminal; a bridge configured to connect the edge part to the terminal coupling part; and a tab coupling part extending inward from the edge (Continued)

part, spaced apart from the bridge and the terminal coupling part, and coupled to the electrode tab. An inner end of the tab coupling part may have a width that gradually decreases as it approaches the terminal coupling part.

22 Claims, 10 Drawing Sheets

(51) Int. Cl.
| | |
|---|---|
| *H01M 50/179* | (2021.01) |
| *H01M 10/04* | (2006.01) |
| *H01M 50/528* | (2021.01) |
| *H01M 50/531* | (2021.01) |
| *H01M 50/538* | (2021.01) |
| *H01M 50/583* | (2021.01) |
| *H01M 50/586* | (2021.01) |

(52) U.S. Cl.
CPC .... *H01M 10/0422* (2013.01); *H01M 10/0431* (2013.01); *H01M 50/528* (2021.01); *H01M 50/531* (2021.01); *H01M 50/538* (2021.01); *H01M 50/583* (2021.01); *H01M 50/586* (2021.01); *H01M 2200/103* (2013.01); *Y02E 60/10* (2013.01)

(58) Field of Classification Search
CPC ............. H01M 50/528; H01M 50/531; H01M 50/533; H01M 50/538; H01M 50/583; H01M 50/586; Y02E 60/10
See application file for complete search history.

(56) References Cited

U.S. PATENT DOCUMENTS

| | | |
|---|---|---|
| 2010/0216001 A1 | 8/2010 | Byun et al. |
| 2011/0256433 A1* | 10/2011 | Fuhr .................. H01M 4/70 |
| | | 429/211 |
| 2012/0263976 A1 | 10/2012 | Byun et al. |
| 2014/0017565 A1 | 1/2014 | Byun et al. |
| 2017/0373339 A1 | 12/2017 | Cho et al. |
| 2018/0182560 A1 | 6/2018 | Khakhalev |
| 2022/0200108 A1 | 6/2022 | Kim |

FOREIGN PATENT DOCUMENTS

| | | |
|---|---|---|
| JP | 2003-77449 A | 3/2003 |
| JP | 4356209 B2 | 11/2009 |
| JP | 4501381 B2 | 7/2010 |
| JP | 4881181 B2 | 5/2011 |
| KR | 10-2009-0003702 A | 1/2009 |
| KR | 10-2010-0096720 A | 8/2010 |
| KR | 10-2016-0110610 A | 9/2016 |
| KR | 10-2020-0134534 A | 12/2020 |

OTHER PUBLICATIONS

Korean Notice Of Allowance for Korean Application No. 10-2022-0010936, dated Aug. 16, 2024.
Korean Office Action for Korean Application No. 10-2022-0010936, dated May 29, 2024.
Korean Office Action for Korean Application No. 10-2022-0010936, dated Oct. 30, 2023.

\* cited by examiner

COLLECTOR AND CYLINDRICAL SECONDARY BATTERY INCLUDING THE SAME

CROSS-REFERENCE TO RELATED APPLICATION

The present application is the National Phase of PCT International Application No. PCT/KR2023/001142, filed on Jan. 25, 2023, which claims priority under 35 U.S. C. 119(a) to Patent Application No. 10-2022-0010936, filed in Republic of Korea on Jan. 25, 2022, all of which are hereby incorporated by reference in their entireties.

TECHNICAL FIELD

The present disclosure relates to a collector and a cylindrical secondary battery including the same.

BACKGROUND ART

A cylindrical secondary battery according to a related art generally has a structure in which a tab connecting a jelly-roll to an external terminal is welded to a foil of the jelly-roll. The cylindrical secondary battery having such a structure has a limited current path, and self-resistance of the jelly-roll is inevitably very high.

Thus, since a method for reducing resistance by increasing a number of tabs connecting the jelly-roll to an external terminal has been tried, there is a limit to reduce resistance to a desired level and sufficiently secure a path of current only by increasing a number of tabs as described above.

Thus, it is necessary to develop a new jelly-roll structure and a structure of a collector suitable for the jelly-roll structure in order to reduce the self-resistance of the jelly-roll. Particularly, the jelly-roll having the new structure and the application of the collector are more necessary for devices that require a battery pack having high output/high capacity, such as, for example, an electric vehicle.

In addition, in the case of the battery pack applied to the electric vehicle and the like, it is inevitably exposed to a lot of vibration and impact when considering the use environment. Therefore, there is a need to develop a cylindrical secondary battery having a structure in which there is little risk of damage to a welded portion even when vibration and an external impact are applied, and a collector structure applied to the cylindrical secondary battery.

SUMMARY OF THE DISCLOSURE

Technical Problem

One object to be implemented by the present disclosure is to provide a collector having a structure suitable for an electrode assembly having a low resistance structure, and a cylindrical secondary battery including the same.

Another object to be implemented by the present disclosure is to provide a collector having a structure that is capable of reducing possibility of damage to a welded portion with an electrode assembly and/or a welded portion with a battery can even when vibration and an impact are applied, and a cylindrical secondary battery including the same.

Technical Solution

A cylindrical secondary battery according to an aspect of the present disclosure may include: an electrode assembly having an electrode tab; a battery can configured to accommodate the electrode assembly therein; a terminal configured to pass through the battery can while being from the battery can; and a collector configured to electrically connect the electrode tab to the terminal. The collector may include: an edge part; a terminal coupling part located inside the edge part, the terminal coupling part being coupled to the terminal; a bridge connecting the edge part to the terminal coupling part; and a tab coupling part extending inward from the edge part, the tab coupling part being spaced apart from the bridge and the terminal coupling part, the tab coupling part being coupled to the electrode tab. An inner end of the tab coupling part may have a width that gradually decreases as it approaches the terminal coupling part.

The bridge and the tab coupling part may be provided in plurality and may be alternately disposed in a circumferential direction of the collector.

The outer end of the bridge may have a width that gradually increases as it approaches the edge part.

The bridge includes a narrow part located between opposite ends of the bridge.

The narrow part may have a width corresponding to 70% to 80% of a width of the bridge at one of the ends of the bridge.

The narrow part may be disposed closer to an outer end of the opposite ends of the bridge.

A distance from a center of the collector to the narrow part may be 0.4 times to 0.9 times a radius of the electrode assembly.

At least a portion of the electrode tab may be bent toward a central axis of the electrode assembly, and the narrow part may be opposite the bent portion of the electrode tab in an axial direction of the electrode assembly.

The narrow part may be defined by recessed grooves at opposite edges of the bridge or a hole extending through the bridge.

The narrow part may have a width less than that of a width of the bridge between the edges of the bridge.

The bridge may be provided with a cover member configured to surround the bridge and may be made of an insulating material having thermal conductivity less than that of the bridge.

The cover member may be made of a polyimide (PI) material.

The edge part may have a width less than a width of the tab coupling part.

The collector may have a radius corresponding to 33% to 102% of a radius of the electrode assembly.

The collector may have a radius corresponding to 33% to 98.5% of an inner radius of the battery can.

The terminal may include a body part coupled to the terminal coupling part and the terminal coupling party may have a radius corresponding to 40% to 320% of a radius of the body part.

At least one opening may be defined between the edge part and the terminal coupling part, and a ratio of a surface area of the at least one opening to a total surface area of the collector may be 40% to 99%.

A collector according to an aspect of the present disclosure may electrically connect an electrode assembly to a terminal passing through a battery can in which the electrode assembly is accommodated. The collector may include: an edge part; a terminal coupling part located inside the edge part, the terminal coupling part may be coupled to the terminal; a bridge connecting the edge part to the terminal coupling part; and a tab coupling part extending inward from the edge part, the tab coupling part being spaced apart from the bridge and the terminal coupling part, the tab coupling part being coupled to an electrode tab provided in the electrode assembly. An inner end of the tab coupling part may have a width that gradually decreases as it approaches the terminal coupling part.

The bridge and the tab coupling part may be provided in plurality, and the bridges and the tab coupling parts are alternately disposed in a circumferential direction of the collector.

An outer end of the bridge may have a width that gradually increases as it approaches the edge part.

The bridge may include a narrow part located between opposite ends of the bridge.

The narrow part may be defined by recessed grooves at opposite edges of the bridge or as a hole extending through the bridge.

The cylindrical secondary battery may be provided with a cover member configured to surround the bridge and may be made of an insulating material having thermal conductivity less than that of the bridge.

A cylindrical secondary battery according to an aspect of the present disclosure may include: an electrode assembly having a first electrode tab and a second electrode tab; a battery can configured to accommodate the electrode assembly therein; a terminal configured to pass through the battery can while being spaced from the battery can; a first collector configured to electrically connect the first electrode tab to the battery can; and a second collector configured to electrically connect the second electrode tab to the terminal.

A difference between a coupling area between the first electrode tab and the first collector and a coupling area between the second electrode tab and the second collector may be three times or less.

The battery can may include a beading part on a circumference of the battery can, the beading part extending inward between the cap plate and the electrode assembly, and the first collector may include a can coupling part coupled to the beading part.

The second collector may not overlap the beading part in a height direction of the electrode assembly.

The second collector may overlap the beading part in a height direction of the electrode assembly, and a width of an area of the beading part, which overlaps the second collector, may be 80% or less of a width of the beading part.

Advantageous Effects

According to an aspect of the present disclosure, when the electrode assembly and the battery can are electrically connected to each other, the resistance may be significantly reduced.

In addition, even when vibration and impact are applied while the secondary battery is used, the possibility of damage to the welded portion between the collector and the electrode assembly and/or the welded portion between the collector and the battery can may be significantly reduced.

In addition, the effects that are obvious to those skilled in the art may be predicted from the configurations according to the various aspects of the present disclosure.

BRIEF DESCRIPTION OF THE DRAWINGS

The following drawings attached in this specification illustrate an aspect of the present disclosure and function to make further understood the technical spirit of the present disclosure along with the detailed description of the disclosure, and thus, the present disclosure should not be construed as being limited to only the drawings.

MODE FOR CARRYING OUT THE DISCLOSURE

Figure 1:
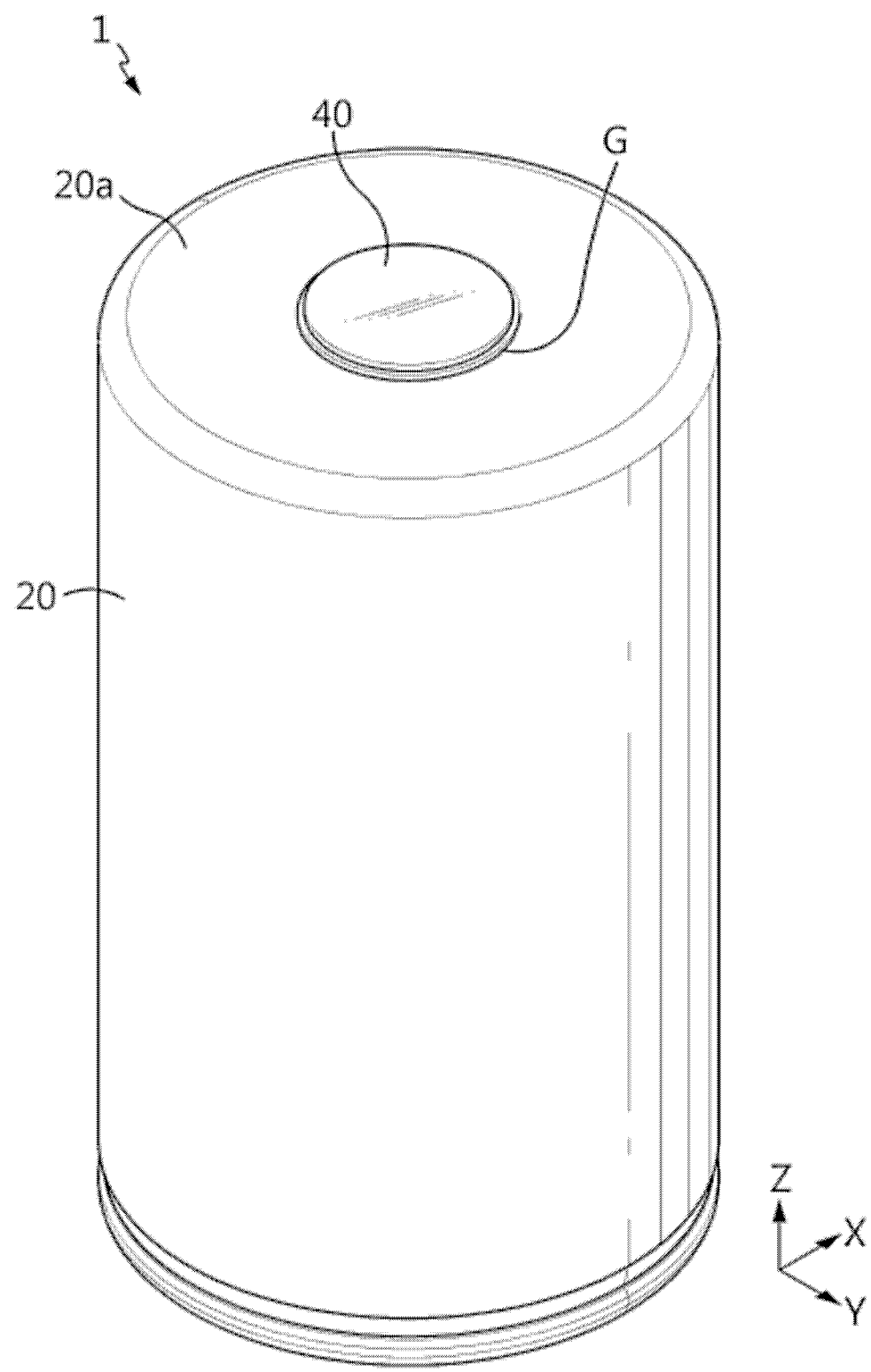
FIG. 1 is a perspective view of a cylindrical secondary battery according to an aspect of the present disclosure.

Hereinafter, various aspects of the present disclosure will be described in detail with reference to the accompanying drawings so that those of ordinary skill in the art can easily carry out the present disclosure. However, the present disclosure may be implemented in several different forms and is not limited or restricted by the following examples.

In order to clearly explain the present disclosure, detailed descriptions of portions that are irrelevant to the description or known related technologies that may unnecessarily obscure the gist of the present disclosure have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present disclosure on the basis of the principle that an inventor can properly define the concept of a term to describe and explain his or her disclosure in the best ways.

Figure 2:
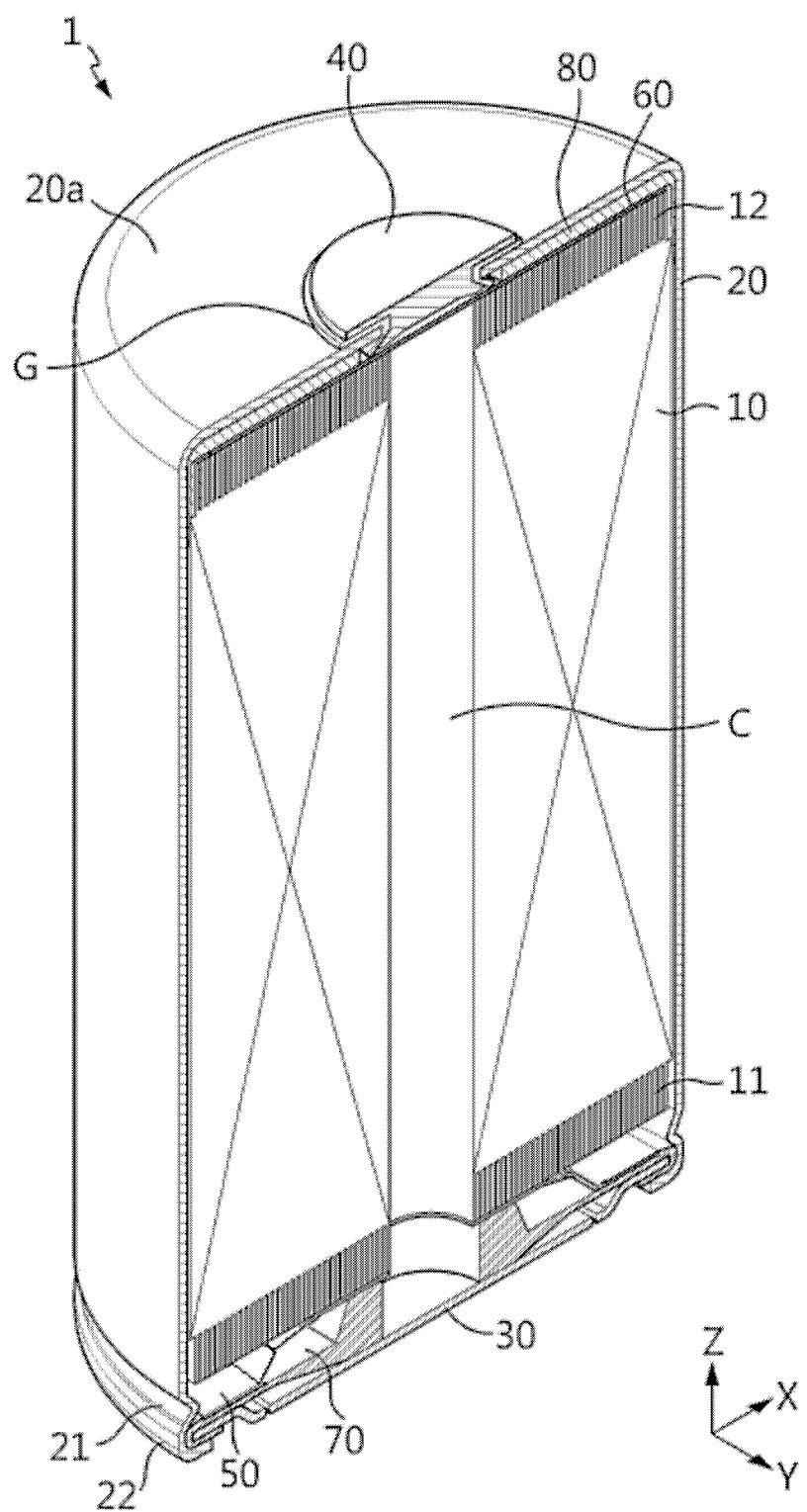
FIG. 2 is a cutaway cross-sectional view of the cylindrical secondary battery according to an aspect of the present disclosure.

FIG. 1 is a perspective view of a cylindrical secondary battery according to an aspect of the present disclosure, and FIG. 2 is a cutaway cross-sectional view of the cylindrical secondary battery according to an aspect of the present disclosure.

A cylindrical 1 secondary battery 1 (hereinafter, referred to as 'secondary battery') according to an aspect of the present disclosure may include an electrode assembly 10 and a battery can 20 accommodating the electrode assembly 10.

The electrode assembly 10 may include a positive electrode, a negative electrode, and a separator interposed between the positive electrode and the negative electrode. In addition, the electrode assembly 10 may be provided with a first electrode tab 11 connected to one of the positive electrode and the negative electrode, and a second electrode tab 12 connected to the other of the positive electrode and the negative electrode.

In more detail, the electrode assembly 10 may be a jelly-roll type. The electrode assembly 10 may be manufactured by winding a stack in which the positive electrode, the separator, the negative electrode, and the separator are sequentially stacked. The electrode assembly 10 may preferably have a height-to-diameter ratio of 1 or more, but is not limited thereto. A hollow C defined to be elongated in a height direction may be defined in a center of the electrode assembly 10. In order to insulate the electrode assembly 10 from an inner circumference of the battery can 20, the separator may be disposed at the outermost side of the electrode assembly 10.

The first electrode tab 11 and the second electrode tab 12 may be provided on opposite ends of the electrode assembly 10 in the height direction, respectively. In more detail, a non-coating portion of any one of the positive electrode and the negative electrode may be disposed on one end of the electrode assembly 10 to function as a first electrode tab 11. The non-coating portion of the other of the positive electrode and the negative electrode may be disposed on the other end of the electrode assembly 10 to function as a second electrode tab 12.

Each of the electrode tabs 11 and 12 may extend along a winding direction of the electrode assembly 10.

Alternatively, each of the electrode tabs 11 and 12 may include a plurality of foil-flags disposed along the winding direction of the electrode assembly 10.

A first collector 50 to be described below may be coupled to the first electrode tab 11, and a second collector 60 to be described below may be coupled to the second electrode tab 12. The electrode assembly 10 may be accommodated in the battery can 20 in a state in which the collectors 50 and 60 are coupled to the electrode tabs 11 and 12, respectively.

For example, the first electrode tab 11 may be a non-coating portion of the negative electrode, and the second electrode tab 12 may be a non-coating portion of the positive electrode. In this case, the first collector 50 may be referred to as a negative electrode collector, and the second collector 60 may be referred to as a positive electrode collector.

The battery can 20 may have a substantially cylindrical shape. One surface 20a may be provided at one side of the battery can 20 in the height direction, and an opening may be defined at the other side.

The electrode assembly 10 may be accommodated in the battery can 20 together with an electrolyte through the opening.

The battery can 20 may have a conductive material such as a metal. The battery can 20 may be electrically connected to the first electrode tab 11 through the first collector 50 to be described below. The battery can 20 may have the same polarity as the first electrode tab 11.

A beading part 21 and a crimping part 22 may be provided on the battery can 20. The beading part 21 and the crimping part 22 may be disposed adjacent to the opening of the battery can 20.

The beading part 21 may be provided by press-fitting a circumference of the battery can 20 inward in a radial direction. An inner diameter of the beading part 21 may be less than an inner diameter of another portion of the battery can 20.

The beading part 21 may be provided in a state in which the electrode assembly 10 is accommodated in the battery can 20. The electrode assembly 10 may be restricted between the one surface 20a of the battery can 20 and the beading part 21 in the height direction of the battery can 20. The beading part 21 may prevent the electrode assembly 10 from being separated from the opening of the battery can 20.

In addition, the beading part 21 may be coupled to the first collector 50. For example, the first collector 50 may be welded to the beading part 21. Thus, the first collector 50 may electrically connect the first electrode tab 11 to the battery can 20.

The crimping part 22 may be disposed adjacent to the beading part 21. The crimping part 22 may be provided by bending an end of a circumferential surface of the battery can 20 inward in a radial direction. The crimping part 22 may be formed after the first collector 50 is coupled to the beading part 21. The crimping part 22 may restrict a cap plate 30, which will be described below, together with the beading part 21.

The secondary battery 1 may include the cap plate 30 covering the opening of the battery can 20.

The cap plate 30 may have a substantially circular plate shape. The cap plate 30, together with the battery can 20, may define an outer appearance of the secondary battery 1. An edge portion of the cap plate 30 may be restricted between the beading part 21 and the crimping part 22 of the battery can 20.

The cap plate 30 may have a material having high rigidity such as a metal. The cap plate 30 may be insulated from the battery can 20 and may not have a polarity. In more detail, a sealing part 72 of a spacer 70 may be interposed between the cap plate 30 and the battery can 20. This will be described in detail below.

The secondary battery 1 may include a terminal 40 fixed by passing through the one surface 20a of the battery can 20.

The terminal 40 may pass through the one surface 20a of the battery can 20, more specifically, a center of the one surface 20a. A portion of the terminal 40 may be exposed to the outside of the battery can 20, and another portion of the terminal 40 may be disposed inside the battery can 20. For example, the terminal 40 may be fixed to the one surface 20a of the battery can 20 by riveting.

The terminal 40 may have a conductive material such as a metal.

The terminal 40 may be coupled to the second collector 60 to be described below. For example, the second collector 60 may be welded to the terminal 40. Thus, the second collector 60 may electrically connect the second electrode tab 12 to the terminal 40.

The terminal 40 may be insulated from the battery can 20. In more detail, an insulating gasket G may be interposed between the terminal 40 and the battery can 20. However, it is not limited thereto, and an insulating coating layer may be disposed on a portion of the terminal 40, or a method for structurally fixing the terminal 40 may be applied while spacing the terminal 40 and the battery can 20 apart from each other.

The insulating gasket G may be deformed during the riveting of the terminal 40 and then be bent toward an inner surface of the one surface 20a of the battery can 20. The insulating gasket G may seal a gap between the terminal 40 and the battery can 20.

That is, the battery can 20 and the terminal 40 may have polarities opposite to each other due to the insulating gasket G. In more detail, the battery can 20 may have the same polarity as the first electrode tab 11, and the terminal 40 may have the same polarity as the second electrode tab 12. Thus, the one surface 20a of the battery can 20 may function as a first terminal having a first polarity, and the terminal 40 may function as a second terminal having a second polarity. Since the one surface 20a of the battery can 20 and the terminal 40 are disposed adjacent to each other, an inner space required for installing a bus bar in the battery module including the plurality of secondary batteries 1 may be reduced, and thus, energy density of the battery module may increase.

The secondary battery 1 may include the first collector 50 electrically connecting the first electrode tab 11 to the battery can 20. For example, the first electrode tab 11 may be connected to the negative electrode of the electrode assembly 10, and the first collector 50 may be referred to as a negative electrode collector.

The secondary battery 1 may include the second collector 60 electrically connecting the second electrode tab 11 to the terminal 40. For example, the second electrode tab 12 may be connected to the positive electrode of the electrode assembly 10, and the second collector 60 may be referred to as a positive collector.

The first collector 50 and the second collector 60 may be disposed within the battery can 20.

The first collector 50 may be disposed between the electrode assembly 10 and the cap plate 30 in the height direction of the battery can 20. The first collector 50 may be coupled to the first electrode tab 11. In more detail, the first collector 50 may be welded to the first electrode tab 11. In addition, the first collector 50 may be welded to the battery can 20, more specifically, to the beading part 21.

The second collector 60 may be disposed between the electrode assembly 10 and the one surface 20a of the battery can 20 in the height direction of the battery can 20. The second collector 60 may be coupled to the second electrode tab 12. In more detail, the second collector 60 may be welded to the second electrode tab 12. In addition, the second collector 60 may be welded to the terminal 40.

The secondary battery 1 may include a spacer 70 disposed between the cap plate 30 and the electrode assembly 10. In more detail, the spacer 70 may be disposed between the cap plate 30 and the first collector 50.

A height of the spacer 70 may correspond to a distance between the cap plate 30 and the electrode assembly 10. The spacer 70 may prevent the electrode assembly 10 from moving or shaking within the battery can 20.

The secondary battery 1 may include an insulator 80 disposed between the electrode assembly 10 and the battery can 20. In more detail, the insulator 80 may be disposed between the second collector 60 and the battery can 20.

The insulator 80 may insulate the second collector 60 and the electrode assembly 10 from the battery can 20. The insulator 80 may have a resin material having insulating properties.

A hole through which the terminal 40 passes may be defined in a center of the insulator 80. The terminal 40 may be coupled to the second collector 60 through the hole.

The insulator 80 may have a substantially cap shape. In this case, a portion of the insulator 80 may be disposed between the one surface 20a of the battery can 20 and the second collector 60, and another portion of the insulator 80 may be disposed between an outer circumference of the second collector 60 and an inner circumference of the battery can 20.

However, it is not limited thereto, and the insulator 80 may have a plate shape disposed between the one surface 20a of the battery can 20 and the second collector 60. In this case, an insulating tape that is separate from the insulator 80 may be interposed between the outer circumference of the second collector 60 and the inner circumference of the battery can 20.

A height of the insulator 80 may correspond to a vertical distance between the one surface 20a of the battery can 20 and the electrode assembly 10. The insulator 80 together with the spacer 70 may prevent the electrode assembly 10 from moving or shaking within the battery can 20.

Figure 3:
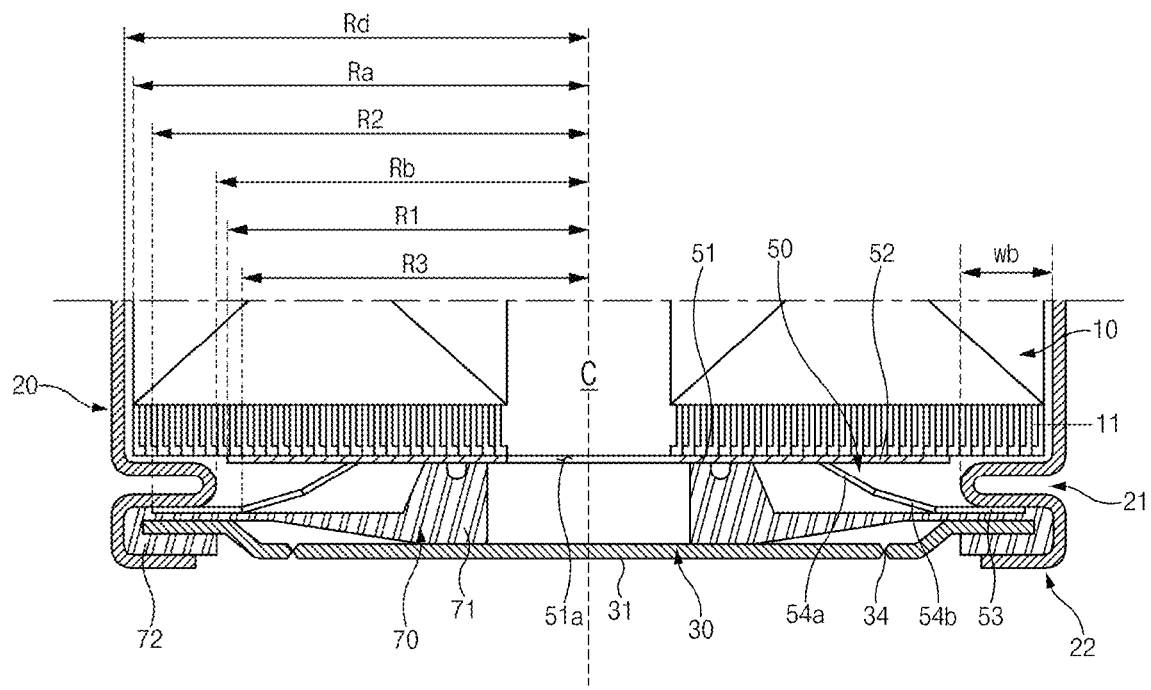
FIG. 3 is an enlarged cross-sectional view of a first collector and surroundings of the first collector, which are illustrated in FIG. 2.
Figure 4:
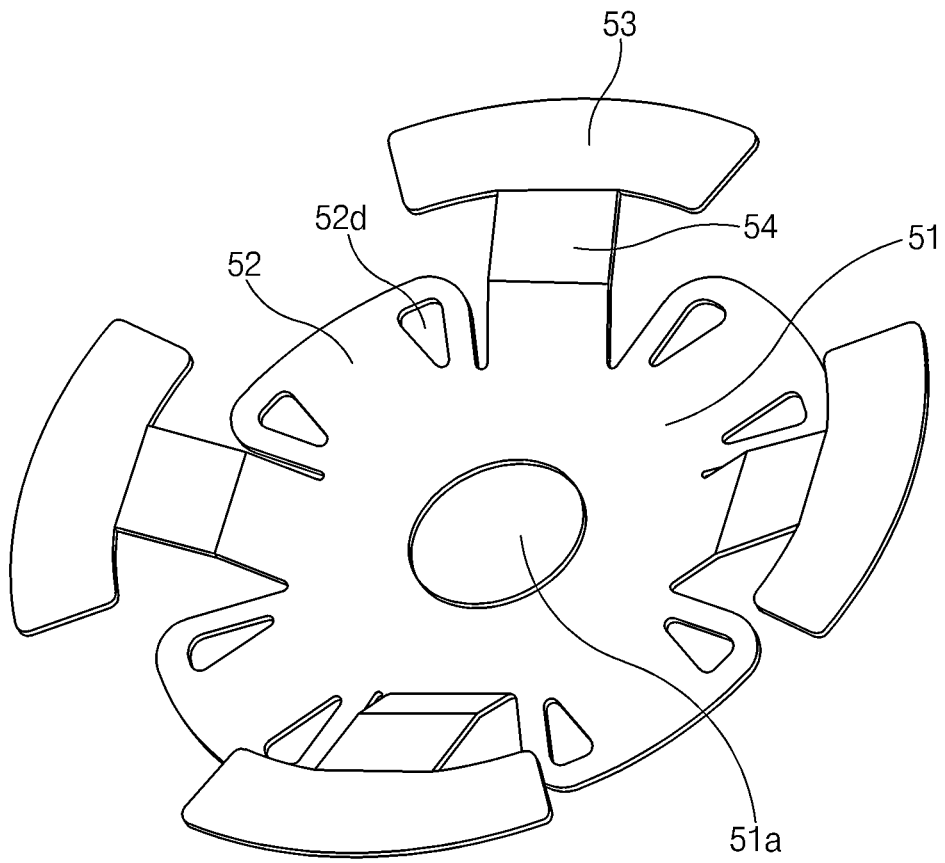
FIG. 4 is a perspective view of the first collector according to an aspect of the present disclosure.

FIG. 3 is an enlarged cross-sectional view of the first collector and surroundings of the first collector, which are illustrated in FIG. 2, and FIG. 4 is a perspective view of the first collector according to an n aspect of the present disclosure.

As described above, the first collector 50 may be coupled to the first electrode tab 11. In more detail, at least a portion of the first electrode tab 11 may be bent toward a hollow C of the electrode assembly 10, and the first collector 50 may be coupled to the bent portion of the first electrode tab 11. Bent portions of the plurality of first electrode tabs 11 adjacent to each other may overlap each other.

As a result, a height of the first electrode tab 11 may be reduced, and energy density of the secondary battery 1 may be improved. In addition, since a coupling area between the first electrode tab 11 and the first collector 50 increases, coupling force between the first electrode tab 11 and the first collector 50 may be improved to reduce resistance.

In more detail, the first collector 50 may include a center part 51, a tab coupling part 52 extending outward from the center part 51 and coupled to the first electrode tab 11, a can coupling part 53 coupled to the battery can 20 and spaced apart from the tab coupling part 52, and a bridge 54 connecting the can coupling part 53 to the center part 51.

The center part 51 may be disposed at a center of one side (e.g., lower side) of the electrode assembly 10. The center part 51 may have an approximately circular shape.

A center hole 51a may be defined in the center part 51. The center hole 51a may face the hollow C of the electrode assembly 10. The center hole 51a together with the hollow C may function as a passage for insertion of a welding rod for the coupling between the terminal 40 and the second collector 60 or laser irradiation. In addition, the center hole 51a may function as a passage through which an electrolyte is smoothly impregnated into the electrode assembly 10 when the electrolyte is injected.

The tab coupling part 52 may be expanded radially outward from the center part 51. The tab coupling part 52 may be coupled to the first electrode tab 11. The tab coupling part 52 may be provided in plurality, and the plurality of tab coupling parts 52 may be radially expanded from the center part 51.

A width of the tab coupling part 52 may increase as a distance from the center part 51 increases. Thus, the tab coupling part 52 may widely cover the bent portion of the first electrode tab 11 and may prevent the bent portion of the first electrode tab 11 from being lifted.

Central axes of each of the electrode assembly 10, the battery can 20, and the first collector 50 may substantially coincide with each other. A distance R1 from the central axis of the electrode assembly 10 to an outer edge of the tab coupling part 52 may be less than a radius Ra of the electrode assembly 10 and also be equal to or less than an inner radius Rb of the beading part 21 in the radial direction of the battery can 20.

In more detail, the outer edge of the tab coupling part 52 may have an arc shape having a first curvature radius R1. A center of curvature of the outer edge may coincide with the center of the first collector 50.

The first curvature radius R1 may be less than the radius Ra of the electrode assembly 10. In addition, the first curvature radius R1 may be less than the inner radius Rb of the beading part 21 disposed on the battery can 20.

The tab coupling part 52 may not overlap the beading part 21 in the height direction of the battery can 20. That is, the tab coupling part 52 may not be disposed between the electrode assembly 10 and the beading part 21. Thus, it is possible to prevent the tab coupling part 52 from being damaged by being jammed between the electrode assembly 10 and the beading part 21 due to a sizing process. The sizing refers to a compression process of reducing a height of the beading part 21 to reduce a height of the secondary battery 1 after the beading part 21 and the crimping part 22 are formed on the battery can 20 in which the electrode assembly 10 is accommodated.

The distance R1 from the central axis of the electrode assembly 10 to the outer edge of the tab coupling part 52 may be equal to or greater than ⅔ of the radius Ra of the electrode assembly 10. In more detail, the first curvature radius R1 may be ⅔ or more of the radius Ra of the electrode assembly 10. Thus, a sufficiently wide contact area of the tab coupling part 52 with respect to the electrode tab 11 of the electrode assembly 10 may be secured.

Both edges of the tab coupling part 52 may be disposed along the radial direction of the first collector 50. A virtual line extending along both the edges may pass through the center of the first collector 50.

An injection hole 52*d* may be provided in the tab coupling part 52. The impregnation of the electrolyte into the electrode assembly 10 may be improved by the injection hole 52*d*.

The width of the injection hole 52*d* may increase as a distance from the center part 51 increases. As a result, the electrolyte may be impregnated more uniformly with respect to the electrode assembly 10 in which a winding length per unit angle becomes longer toward the outside of the radius.

The can coupling part 53 may be coupled to the battery can 20, more specifically to the beading part 21. The can coupling part 53 may be coupled to a surface disposed relatively far from the electrode assembly 10 on the beading part 21.

The can coupling part 53 may have a predetermined height difference with respect to the center part 51 and the tab coupling part 52. The height difference may mean a distance between the tab coupling part 52 and the can coupling part 53 with respect to the height direction of the battery can 20. The height difference may correspond to the height of the beading part 21. That is, the distance between the tab coupling part 52 and the can coupling part 53 in the height direction of the battery can 20 may be the same as or similar to the height of the beading part 21.

The can coupling part 53 may be pressed by a sealing part 72 to be described below. In more detail, the can coupling part 53 may be interposed and fixed between the sealing part 72 and the beading part 21.

The can coupling part 53 may be spaced apart from the tab coupling part 52. In more detail, each of the can coupling part 53 and the tab coupling part 52 may be only connected to the center part 51, and the can coupling part 53 and the tab coupling part 52 may not be directly connected to each other. As a result, when an impact or vibration is applied to the secondary battery 1, stress applied to the coupled portion between the tab coupling part 52 and the first electrode tab 11 and the coupled portion between the can coupling part 53 and the battery can 20 are dispersed, and the possibility of occurrence of damage to the first collector 50 may be minimized.

The can coupling part 53 may be provided in plurality. The can coupling part 53 and the tab coupling part 52 may be alternately disposed in a circumferential direction of the first collector 50.

The can coupling part 53 may extend along the inner circumference of the battery can 20. That is, the can coupling part 53 may extend in the circumferential direction of the beading part 21. Since a contact area between the can coupling part 53 and the beading part 21 increases, the can coupling part 53 and the beading part 21 may be stably coupled to each other, and the resistance between the can coupling part 53 and the beading part 21 may decrease.

A distance R2 from the central axis of the electrode assembly 10 to the outer edge of the can coupling part 53 may be greater than the distance R1 from the central axis of the electrode assembly 10 to the outer edge of the tab coupling part 52 in the radial direction of the battery can 20. In addition, a distance R3 from the central axis of the electrode assembly 10 to the inner edge of the can coupling part 53 may be less than the distance R2 from the central axis of the electrode assembly 10 to the outer edge of the can coupling part 53 in the radial direction of the battery can 20.

In more detail, the outer edge of the can coupling part 53 may have an arc shape having a second curvature radius R2 greater than the first curvature radius R1 described above. Also, the inner edge of the can coupling part 53 may have an arc shape having a third curvature radius R3 less than the second curvature radius R2. The center of curvature of the outer edge and the inner edge of the can coupling part 53 may substantially coincide with the central axis of the electrode assembly 10.

The second curvature radius R2 may be greater than the inner radius Rb of the beading part 21 disposed on the battery can 20, and the third curvature radius R3 may be less than the inner radius Rb of the beading part 21. That is, the distance R2 from the central axis of the electrode assembly 10 to the outer edge of the can coupling part 53 may be greater than the inner radius Rb of the beading part 21, and the distance R3 from the central axis of the electrode assembly 10 to the inner edge of the can coupling part 53 may be less than the inner radius Rb of the beating part 21 in the radial direction of the battery can 20.

If the second curvature radius R2 is equal to or less than the inner radius Rb of the beading part 21, it may be difficult to couple the can coupling part 53 to the beading part 21. If the third curvature radius R3 is equal to or greater than the inner radius Rb of the beading part 21, interference may occur between the bridge 54 to be described below and the beading part 21.

Both edges of the can coupling part 53 may be disposed along the radial direction of the first collector 50. A virtual line extending along both the edges may pass through the center of the first collector 50.

The can coupling part 53 and the tab coupling part 52 may not overlap each other in the height direction of the battery can 20. Thus, when a plurality of first collectors 50 are provided prior to one of them being coupled to the electrode assembly 10, the can coupling parts 53 of one first collector 50 and the tab coupling part 52 of another first collector 50 may be prevented from interfering with each other.

Coupling strength between the can coupling part 53 and the battery can 20, more specifically, between the can coupling part 53 and the beading part 21, may be greater than that between the tab coupling part 52 and the first electrode tab 11. Thus, the can coupling part 53 may be stably coupled to the rigid battery can 20.

The bridge 54 may connect the can coupling part 53 to the center part 51. The bridge 54 may extend radially outward from the center part 51 and may be spaced apart from the tab coupling part 52 in the circumferential direction of the first collector 50.

The bridge 54 may be provided in plurality, like the can coupling part 53, and the plurality of bridges 54 may extend radially from the center part 51. The bridges 54 and the tab coupling parts 52 may be alternately disposed in the circumferential direction of the first collector 50.

Since there is a height difference between the center part 51 and the can coupling part 53, the bridge 54 may be inclined. The bridge 54 may obliquely extend in a direction away from the electrode assembly 10 as the distance from the center part 51 increases.

An inclination of the bridge 54 may become smaller as the distance from the center part 51 increases. In more detail, the bridge 54 may include a first inclined part 54a extending from the center part 51 and a second inclined part 54b extending from the first inclined part 54a and having a smaller inclination than the first inclined part 54a.

However, it is not limited thereto, and the bridge 54 may be rounded in a direction that becomes smaller as the distance from the center part 51 increases.

Thus, it is possible to prevent the bridge 54 from being excessively deformed due to the sizing process and prevent the center part 51 and the first electrode tab 11 coupled to the center part 51 from being lifted. During the sizing process, since the beading part 21 is compressed toward the electrode assembly 10 to decrease in height, the tab coupling part 53 coupled to the beading part 21 may also move toward the electrode assembly 10. As a result, repulsive force in a direction away from the electrode assembly 10 may act on the center part 51 connected to the tab coupling part 53 and the bridge 54. If the inclination of the bridge 54 is constant or becomes steeper as it moves away from the center part 51, the repulsive force may largely act on the center part 51, and, thus, the center part 51 and the first electrode tab 11 coupled to the center part 51 may be lifted. On the other hand, the bridge 54 according to the present aspect may minimize the lifting of the center part 51 and the first electrode tab 11, which is caused by the sizing process.

In addition, a process of press-fitting the outer circumference of the battery can 20 inward to form the beading part 21 may be performed in a state in which the electrode assembly 10 to which the first collector 50 is coupled is accommodated in the battery can 20. In this process, since the bridge 54 is decreasingly inclined as it moves away from the center part 51, the beading part 21 may be easily formed without interfering with the bridge 54.

An edge of the cap plate 30 may be disposed between the beading part 21 and the crimping part 22 of the battery can 20 and may be fixed by a sealing part 72 to be described below.

The cap plate 30 may not protrude beyond the battery can 20. For example, when the cap plate 30 is disposed on a lower end of the battery can 20, a bottom surface of the plate part 31 of the cap plate 30 may be disposed on the same surface as the bottom surface of the battery can 20 or be disposed higher than the bottom surface of the battery can 20. Thus, the cap plate 30 may not be pressed upward by the bottom surface supporting the battery can 20, and a phenomenon in which a pressure required for rupturing the venting part 34 due to a weight of the secondary battery 1 is different from a design value may be prevented from occurring.

A venting part 34 may be provided in the cap plate 30. The venting part 34 may have a thickness less than that of the surrounding area. Thus, the venting part 34 may be structurally weak compared to a surrounding area thereof, and if an internal pressure of the battery can 20 increases beyond a preset value, the venting part 34 may be preferentially ruptured.

The venting part 34 may be disposed along a circumferential direction of the cap plate 30. For example, the venting part 34 may have a closed loop shape such as a ring. Therefore, when the venting part 34 is ruptured, an area of the cap plate 30 disposed inside the venting part 34 may be easily separated to form an opening, and a gas in the battery can 20 may be quickly discharged.

The venting part 34 may be formed by notching opposite surfaces of the cap plate 30 to a predetermined depth to partially reduce the thickness of the cap plate 30. However, it is not limited thereto, and it may be possible to form the venting part 34 by notching only one surface of the cap plate 30.

In order to effectively absorb an impact or shaking applied to the secondary battery 1, the spacer 70 may have an elastic material.

The spacer 70 may correspond to a distance between the first collector 50 and the cap plate 30. In this case, the body part 71 may effectively prevent the electrode assembly 10 from moving within the battery can 20 due to a gap defined between the first collector 50 and the cap plate 30. Therefore, the spacer 70 may prevent a coupled portion between the electrode assembly 10 and the first collector 50 and/or a coupled portion between the first collector 50 and the battery can 20 from being damaged.

An opening facing a hollow C of the electrode assembly 10 may be defined in the spacer 70 through a center hole 51a of the first collector 50. The opening together with the center hole 51a and the hollow C may function as a passage for inserting a welding rod or a passage for laser irradiation. In addition, the opening may function as a passage through which an electrolyte is smoothly impregnated into the electrode assembly 10 when the electrolyte is injected.

The sealing part 72 may be integrated with the spacer 70. However, this aspect is not limited thereto.

The sealing part 72 may have a circular ring shape extending along an inner circumference of the battery can 20. The sealing part 72 may be fixed between the beading part 21 and the crimping unit 22 of the battery can 20. A portion of the sealing part 72 may be bent together with a crimping part 22 to fix an edge of the cap plate 30. Thus, the sealing part 72 may firmly seal the gap between the cap plate 30 and the battery can 20. As described above, the sealing part 72 may function as a gasket for improving fixing force of the cap plate 30 and sealing force of the battery can 20.

The sealing part 72 may press the can coupling part 53 of the first collector 50 toward the beading part 21 to further strengthen the coupling between the can coupling part 53 and the beading part 21. In addition, the sealing part 72 may insulate the can coupling part 53 from the cap plate 30.

Figure 5:
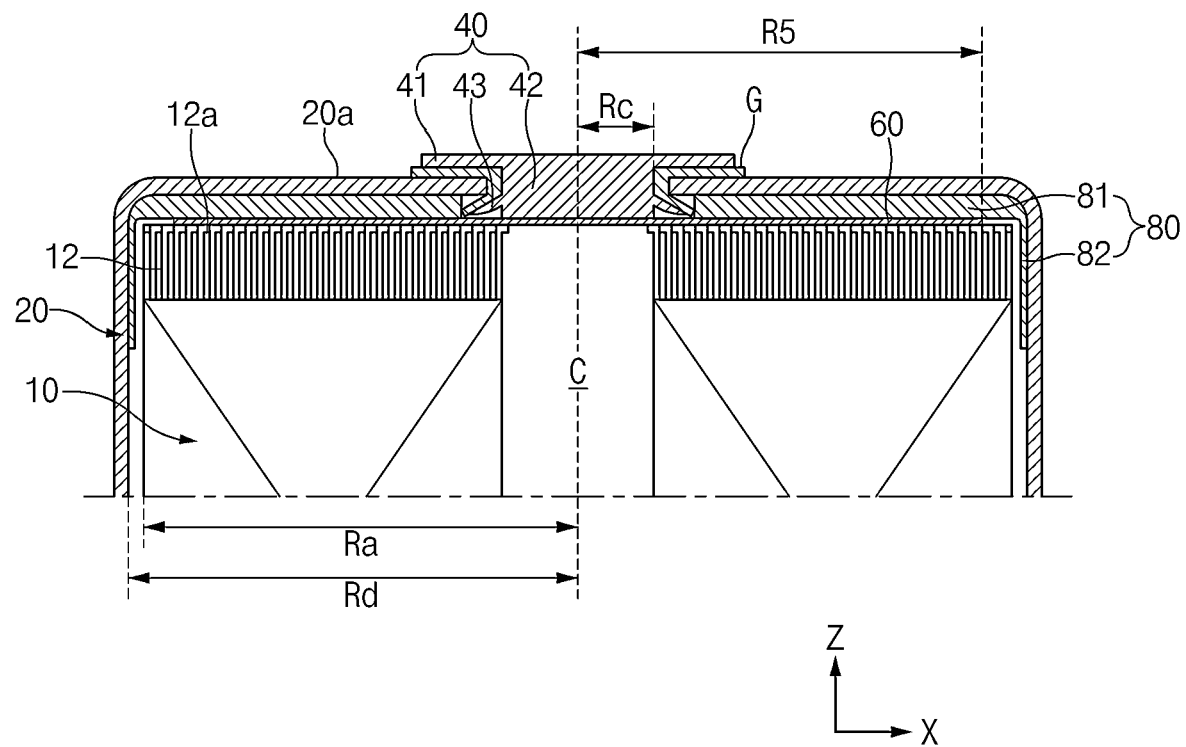
FIG. 5 is an enlarged cross-sectional view of a second collector and surroundings of the second collector, which are illustrated in FIG. 2.
Figure 6:
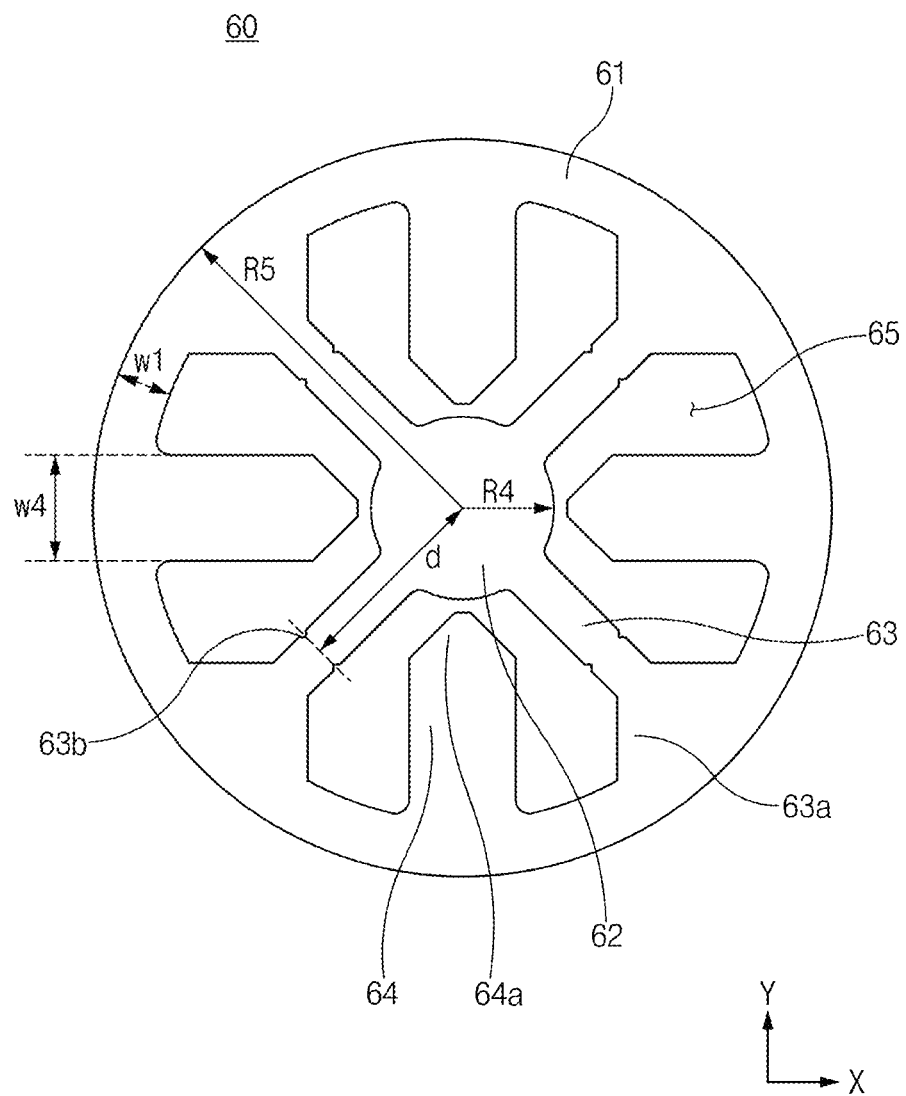
FIG. 6 is a plan view of the second collector according to an aspect of the present disclosure.
Figure 7:
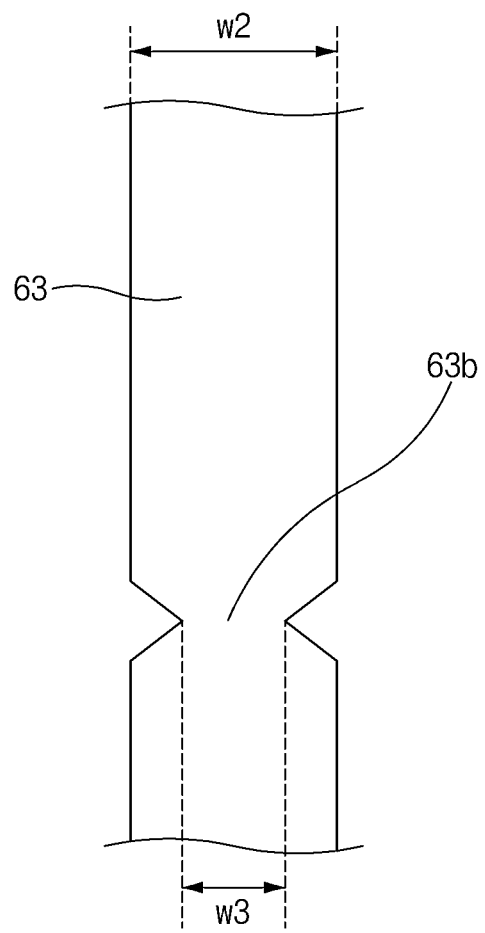
FIG. 7 is an enlarged view illustrating a narrow part illustrated in FIG. 6.

FIG. 5 is an enlarged cross-sectional view of a second collector and surroundings of the second collector, which are illustrated in FIG. 2, FIG. 6 is a plan view of the second collector according to an aspect of the present disclosure, and FIG. 7 is an enlarged view illustrating a narrow part illustrated in FIG. 6.

As described above, the terminal 40 may pass through a central portion of the one surface 20a of the battery can 20 and be coupled to the second collector 60 so as to be electrically connected to the second electrode tab 12. In addition, the terminal 40 may be insulated from the battery can 20 by an insulating gasket G.

In more detail, the terminal 40 may include a terminal part 41, a body part 42 and a protrusion 43.

The terminal part 41 may be disposed outside the battery can 20. The terminal part 41 may be a portion to which a bus bar disposed outside the battery can 20 can be connected. The terminal part 41 may have a substantially circular flat plate shape.

The body part 42 may be integrated with the terminal part 41. The body part 42 may pass through the battery can 20 and be coupled to the second collector 60, which may include a tab coupling part 64 to be described in more detail below. The body part 42 may have a substantially circular columnar shape.

The protrusion 43 may protrude radially outward from a circumference of the body part 42 and may be disposed inside the battery can 20. The protrusion 43 may be integrated with the body part 42. The protrusion 43 may be disposed to be inclined in a direction closer to the second collector 60 as it moves away from an outer circumference of the body part 42.

An end of the protrusion 43 may not protrude toward the second collector 60 more than an end of the body part 42. Therefore, it is possible to prevent the second collector 60 from being damaged by the protrusion 43.

A diameter of each of the terminal part 41 and the protrusion 43 may be greater than a diameter of the body part 42. As a result, the terminal 40 may be fixed so as not to be separated from the battery can 20.

The insulating gasket G may seal a gap between the terminal 40 and the battery can 20. In more detail, the insulating gasket G may be bent along the terminal part 41 and the protrusion 43 and fixed between the battery can 20 and the terminal 40.

The insulator 80 may insulate the second collector 60 from the battery can 20. The insulator 80 may be disposed between the second collector 60 and the battery can 20.

In more detail, the insulator 80 may include a plate part 81 and a circumferential part 82.

The plate unit 81 may be disposed between the second collector 60 and the one surface 20a of the battery can 20. The plate part 81 may have an approximately circular plate shape.

A hole through which the terminal 40 passes may be defined in a center of the plate part 81. The terminal 40 may be coupled to the second collector 60 toward the hole. An end of the protrusion 43 of the terminal 40 may face an inner circumference of the hole.

The circumferential part 82 may protrude from an edge of the plate part 81 between the inner circumference of the battery can 20 and the outer circumference of the electrode assembly 10. The circumferential part 82 may be integrated with the plate part 81, but is not limited thereto.

The circumferential part 82 may be disposed between the outer circumference of each of the second collector 60 and the second electrode tab 12 and the inner circumference of the battery can 20. A height of the circumferential part 82 in the height direction of the battery can 20 may be greater than the sum of the heights of the second electrode tab 12 and the second collector 60. Thus, the circumferential part 82 may reliably insulate the second electrode tab 12 and the second collector 60 from the battery can 20.

Central axes of the electrode assembly 10, the battery can 20, and the second collector 60 may substantially coincide with each other.

The second collector 60 may be coupled to the second electrode tab 12. In more detail, at least a portion of the second electrode tab 12 may be bent toward a hollow C of the electrode assembly 10, and the second collector 60 may be coupled to the bent portion 12a of the second electrode tab 12. portions 12a of the plurality of first electrode tabs 12 adjacent to each other may overlap each other.

As a result, a height of the second electrode tab 12 may be reduced, and energy density of the secondary battery 1 may be improved. In addition, since a coupling area between the second electrode tab 12 and the second collector 60 increases, coupling force between the second electrode tab 12 and the second collector 60 may be improved to reduce resistance.

In more detail, the second collector 60 may include an edge part 61, a terminal coupling part 62 disposed inside the edge part 61 and coupled to the terminal 40, a bridge 63 connecting the edge part 61 to the terminal coupling part 62, and a tab coupling part 64 extending inward from the edge part 61, spaced apart from the bridge 63 and the terminal coupling part 62, and coupled to the second electrode tab 12.

The edge part 61 may have a substantially circular rim shape. However, this aspect is not limited thereto. The edge part 61 may be disposed between the second electrode tab 12 and the insulator 80 in the height direction of the battery can 20.

The terminal coupling part 62 may be disposed at an inner center of the edge part 61. At least a portion of the terminal coupling part 62 may face the hollow C of the electrode assembly 10.

The terminal coupling part 62 may have a substantially circular shape. The terminal coupling part 62 may be coupled to the terminal 40, more specifically, to the body part 42 of the terminal 40. For example, the terminal coupling part 62 may be welded to a bottom surface of the body part 42 of the terminal 40.

The bridge 63 may connect the edge part 61 to the terminal coupling part 62. The bridge 63 may extend radially inward from the edge part 61.

The bridge 63 may be provided in plurality, and the plurality of bridges 63 may extend radially from the terminal coupling part 62.

A width of an outer end 63a of the bridge 63 may increase as it approaches the edge part 61. Thus, rigidity of a portion at which the bridge 63 and the circumferential part 61 are connected to each other may be improved. In addition, when the second collector 60 is transferred or transported, the outer end 63a of the bridge 63 having relatively high rigidity may be gripped and transported stably.

The tab coupling part 64 may extend radially inward from the edge part 61. The tab coupling part 64 may be coupled to the second electrode tab 12. For example, the tab coupling part 64 may be welded to the bent portion 12a of the second electrode tab 12.

The tab coupling part 64 may be spaced apart from the terminal coupling part 62. In more detail, the tab coupling part 64 may be spaced apart from the terminal coupling part 62 in the radial direction of the second collector 60. In more detail, each of the tab coupling part 64 and the terminal coupling part 62 may be only connected to the circumferential part 61, and the tab coupling part 64 and the terminal coupling part 62 may not be directly connected to each other. As a result, when an impact or vibration is applied to the secondary battery 1, since stress applied to the coupling area between the tab coupling part 64 and the second electrode tab 12 and the coupled portion between the terminal coupling part 62 and the terminal 40 are dispersed, possibility of occurrence of damage of the second collector 60 may be minimized.

The tab coupling part 64 may be spaced apart from the bridge 63. In more detail, the tab coupling part 64 may be spaced apart from the bridge 63 in the circumferential direction of the second collector 60.

The tab coupling part 64 may be provided in plurality. In the case of the present aspect, the number of tab coupling parts 64 and the number of bridges 63 may be the same. The bridges 63 and the tab coupling parts 64 may be alternately disposed in the circumferential direction of the second collector 60. Each of the bridges 63 may be disposed between a pair of tab coupling parts 64 adjacent to each other in the circumferential direction of the second collector 60.

A width w2 of the bridge 63 may be less than or equal to a width w4 of the tab coupling part 64. As a result, electrical resistance may increase in the bridge 63, and when overcurrent occurs, a portion of the bridge 63 is ruptured to block the overcurrent.

In order to improve the overcurrent blocking function, a narrow part 63b having a relatively narrow width may be provided in the bridge 63. For example, the narrow part 63b may be provided by recessing grooves in opposite edges of the bridge 63.

A width w3 of the narrow part 63b may be narrower than the width w2 of the bridge 63. Also, the width w3 of the narrow part 63b may be narrower than the width w1 of the edge part 61.

Thus, when the electrical resistance increases in the narrow part 63b, and the overcurrent flows through the bridge 63, the narrow part 63b is ruptured preferentially rather than the edge part 61 and the bridge 63 to reliably block the overcurrent. That is, the narrow part 63b may perform a fuse function.

In more detail, the width w3 of the narrow part 63b may be 70% to 80% of the width w2 of the bridge 63. Thus, the high reliability of the fuse function may be maintained while maintaining sufficient high rigidity of the narrow part 63b. If the width w3 of the narrow part 63b is less than 70% of the width w2 of the bridge 63, there is a concern that the narrow part 63b is easily ruptured when the impact or vibration is applied to the secondary battery 1. In addition, if the width w3 of the narrow part 63b is greater than 80% of the width w2 of the bridge 63, there is a concern that the narrow part 63b may not ruptured preferentially when the overcurrent flows.

The narrow part 63b may face the bent portion 12a of the second electrode tab 12 with respect to the height direction of the electrode assembly 10. Thus, the bent portion 12a of the second electrode tab 12 may prevent residues generated when the narrow part 63b is ruptured from being introduced into the electrode assembly 10.

The narrow part 63b may be disposed closer to the outer end 63a of the ends of the bridge 63.

A distance d from the center of the second collector 60 to the narrow part 63b is 0.4 times to 0.9 times the radius Ra of the electrode assembly 10 in the radial direction of the second collector 60. That is, a distance d from the central axis of the electrode assembly 10 to the narrow part 63b is 0.4 times to 0.9 times the radius Ra of the electrode assembly 10 in the radial direction of the electrode assembly 10.

As described above, the bent portions 12a of the second electrode tab 12 may overlap each other. In this case, in some areas adjacent to the outer circumference of the electrode assembly 10 and in some areas adjacent to the hollow C, an overlapping degree or number of bent portions 12a of the second electrode tab 12 may be reduced. For this reason, if the distance d from the center of the second collector 60 to the narrow part 63b is less than 0.4 times or larger than 0.9 times the radius Ra of the electrode assembly 10, the residues generated when the narrow part 63b is ruptured may be introduced into the electrode assembly 10.

On the other hand, as in the present aspect, when the distance d from the center of the second collector 60 to the narrow part 63b is 0.4 times to 0.9 times the radius Ra of the electrode assembly 10, the narrow part 63b may face the area on which the bent portions 12a of the second electrode tab 12 sufficiently overlap each other in the height direction of the electrode assembly 10. Thus, it is possible to reliably prevent the residues generated when the narrow part 63b is ruptured from being introduced into the electrode assembly 10.

At least one opening 65 may be defined between the edge part 61 and the terminal coupling part 62. When there are a plurality of bridges 63, a plurality of openings 65 divided into a plurality of areas by the plurality of bridges 63 may be defined. The tab coupling part 64 may reduce a surface area of the opening 65.

In more detail, a ratio occupied by a surface area of the at least one opening 65 to the total surface area of the second collector 60 may be 40% to 99%. The total surface area of the second collector 60 may mean that sum of all values of respective surface areas of the edge part 61, the terminal coupling part 62, the bridge 63, the tab coupling part 64, and the opening portion 65. Thus, impregnation of the electrolyte into the electrode assembly 10 may be improved by the opening 65. If the surface area of at least one opening 65 is less than 40% of the total surface area of the second collector 60, the impregnation of the electrolyte into the electrode assembly 10 may be deteriorated.

The inner end 64a of the tab coupling part 64 may be spaced a predetermined apart from the terminal coupling part 62 to define a predetermined gap. A width of the inner end 64a of the tab coupling part 64 may decrease as it approaches the terminal coupling part 62. As a result, the surface area of the opening 65 may further increase, and the impregnation of the electrolyte into the electrode assembly 10 may be improved.

A width w1 of the edge part 61 may be narrower than a width w4 of the tab coupling part 64. Thus, it is possible to secure a sufficiently wide coupling area between the tab coupling part 64 and the second electrode tab 12 while maintaining the sufficient wide area of the open portion 65.

A radius R5 of the second collector 60 may be 33% to 102% of the radius Ra of the electrode assembly 10. In addition, the radius R5 of the second collector 60 may be 33% to 98.5% of an inner radius Rd of the battery can 20. The radius R5 of the second collector 60 may mean a distance from the center of the second collector 60 to the outer circumference of the edge part 61.

If the radius R5 of the second collector 60 is less than 33% of the radius Ra of the electrode assembly 10 or less than 33% of the inner radius Rd of the battery can 20, a function as an electrical passage of the second collector 60 connecting the second electrode tab 12 to the terminal 40 may be deteriorated.

On the other hand, when the radius R5 of the second collector 60 is greater than 102% of the radius Ra of the electrode assembly 10 or greater than 98.5% of the inner radius Rd of the battery can 20, the edge part 61 of the second collector plate 60 may interfere with the edge part 82 of the insulator 80, and if a size of the battery can 20 increases, or a size of the electrode assembly 10 decreases in order to prevent the interference, the energy density of the secondary battery 1 may decrease.

The radius R4 of the terminal coupling part 62 may be 40% to 320% of the radius Rc of the body part 42 coupled to the terminal coupling part 62 at the terminal 40. In more detail, the radius R4 of the terminal coupling part 62 may be 40% to 320% of the radius Rc of the bottom surface of the body part 42.

If the radius R4 of the terminal coupling part 62 is less than 40% of the radius Rc of the body part 42, the coupling area between the terminal coupling part 62 and the terminal 40 becomes too small, resulting in increasing in resistance. On the other hand, when the radius R4 of the terminal coupling part 62 is greater than 320% of the radius Rc of the body part 42, a length of the tab coupling part 64 spaced apart from the terminal coupling part 62 may be shortened, and the surface area of the opening 65 may be reduced. As a result, the coupling area between the second electrode tab 12 and the tab coupling part 64 may decrease, which could lead to an increase in resistance, and the impregnation of the electrolyte into the electrode assembly 10 may decrease.

A difference between the coupling area between the first electrode tab 11 and the first collector 50 (see FIG. 3) and the coupling area between the second electrode tab 12 and the second collector 60 may be three times or less. For convenience of explanation, the coupling area between the first electrode tab 11 and the first collector 50 may be referred as a first coupling area, and the coupling area between the second electrode tab 12 and the second collector 60 may be referred to as a second coupling area.

The first coupling area may be a coupling area between the first electrode tab 11 and the tab coupling part 52 (see FIG. 4) of the first collector 50. The second coupling area may be a coupling area between the second electrode tab 12 and the tab coupling part 64 of the second collector 60.

Any one of the first coupling area and the second coupling area may be 3 times or less of the other one. Preferably, the first coupling area may be the same as or similar to the second coupling area. Thus, excessive increase in resistance of either the first collector 50 or the second collector 60 may be prevented from occurring.

The second collector 60 may not overlap the beading part 21 (see FIG. 3) in the height direction of the electrode assembly 10.

Alternatively, the second collector 60 may overlap the beading part 21 in the height direction of the electrode assembly 10, and a width of an area overlapping the second collector 60 on the beading part 21 may be 80% or less of a width wb of the beading part 21. That is, the second collector 60 may overlap by 80% or less of the width wb of the beading part 21 in the height direction of the electrode assembly 10. In this case, the width wb of the beading part 21 may mean the width of the battery can 20 in the radial direction.

If the second collector 60 overlaps by more than 80% of the width wb of the beading part 21 in the height direction of the electrode assembly 10, the second collector 60 may interfere with the circumferential part 82 of the insulator 80, and thus, in order to prevent the interference, if the battery can increases in size, or the electrode assembly 10 decreases in size, the energy density of the secondary battery 1 may be reduced.

Figure 8:
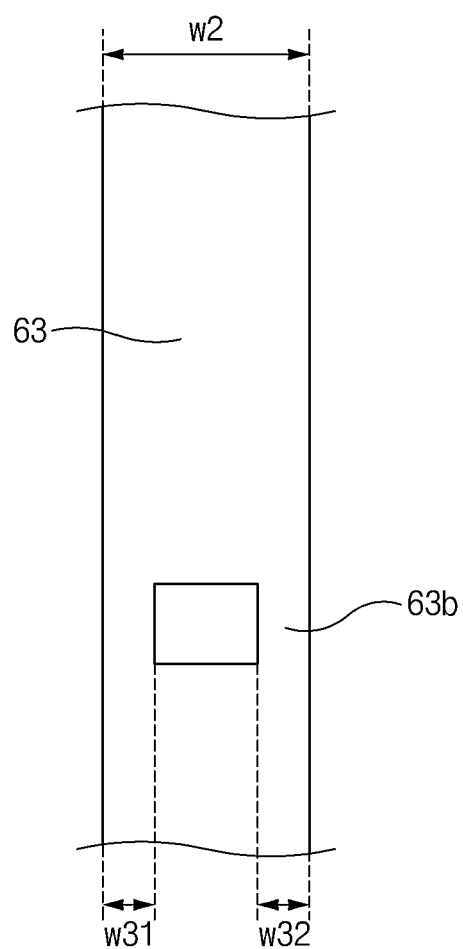
FIG. 8 is a view illustrating a modified example of the narrow part illustrated in FIG. 6.

FIG. 8 is a view illustrating a modified example of the narrow part illustrated in FIG. 6.

As described above, the narrow part 63b may be provided by recessing the grooves on opposite edges of the bridge 63. However, it is not limited thereto, and as illustrated in FIG. 8, the narrow part 63b may be provided by providing a hole in the bridge 63.

In more detail, a hole may be defined in the central portion of the bridge 63 in the width direction, and opposite sides of the hole may constitute the narrow part 63b. In this case, the width w3 of the narrow part 63b may mean a sum of a width w31 of one side of the hole and a width w32 of the other side of the hole. Regarding the width w3 of the narrow part 63b, the above description is cited.

Figure 9:
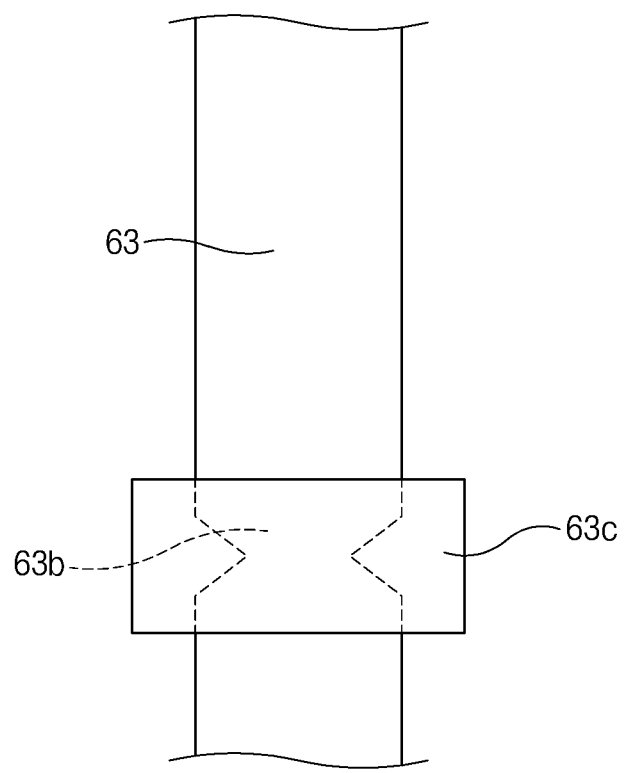
FIG. 9 is a view illustrating a state in which a cover member surrounds the narrow part illustrated in FIG. 6.

FIG. 9 is a view illustrating a state in which a cover member surrounds the narrow part illustrated in FIG. 6.

A cover member 63c made of an insulating material may be provided on the bridge 63 of the second collector 60 to cover the narrow part 63b. For example, the cover member 63c may be a tape taped to cover the narrow part 63b.

The cover member 63c may prevent the residues generated when the bridge 63, particularly the narrow part 63b is ruptured by the overcurrent from being spread to the surroundings.

In addition, since the cover member 63c deteriorates heat dissipation of the narrow part 63b, if the overcurrent flows through the bridge 63, an amount of heat generated in the narrow part 63b may further increase, and the narrow part 63b may be ruptured more quickly. In order to effectively deteriorate the heat dissipation of the narrow part 63b, thermal conductivity of the cover member 63c may be less than that of the bridge 63.

For example, the cover member 63c may include a polyimide (PI) material. Since the polyimide (PI) material has a melting point of approximately 375 degrees Celsius to 401 degrees Celsius, the cover member 63c may not be melted due to the heat generated by the bridge 63.

Unlike the structure illustrated in FIG. 9, a structure in which the narrow part 63b is not provided in the bridge 63, and the cover member 63c covers a specific point of the bridge 63 is also possible. In this case, since the cover member 63c deteriorates the heat dissipation at a specific point of the bridge 63, when the overcurrent flows through the bridge 63, an amount of heat generated at the specific point may increase and thus be preferentially ruptured. That is, the specific point of the bridge 63 surrounded by the cover member 63c may perform a fuse function.

Therefore, a portion of the previous description of the narrow part 63b may be cited for the cover member 63c. More specifically, the cover member 63c may be disposed closer to the outer end 63a of the ends of the bridge 63. Also, the cover member 63c may face the bent portion 12a of the second electrode tab 12 in the axial direction of the electrode assembly 10. In addition, a distance d from the center of the second collector 60 to the cover member 63b is 0.4 times to 0.9 times the radius Ra of the electrode assembly 10 in the radial direction of the second collector 60.

Figure 10:
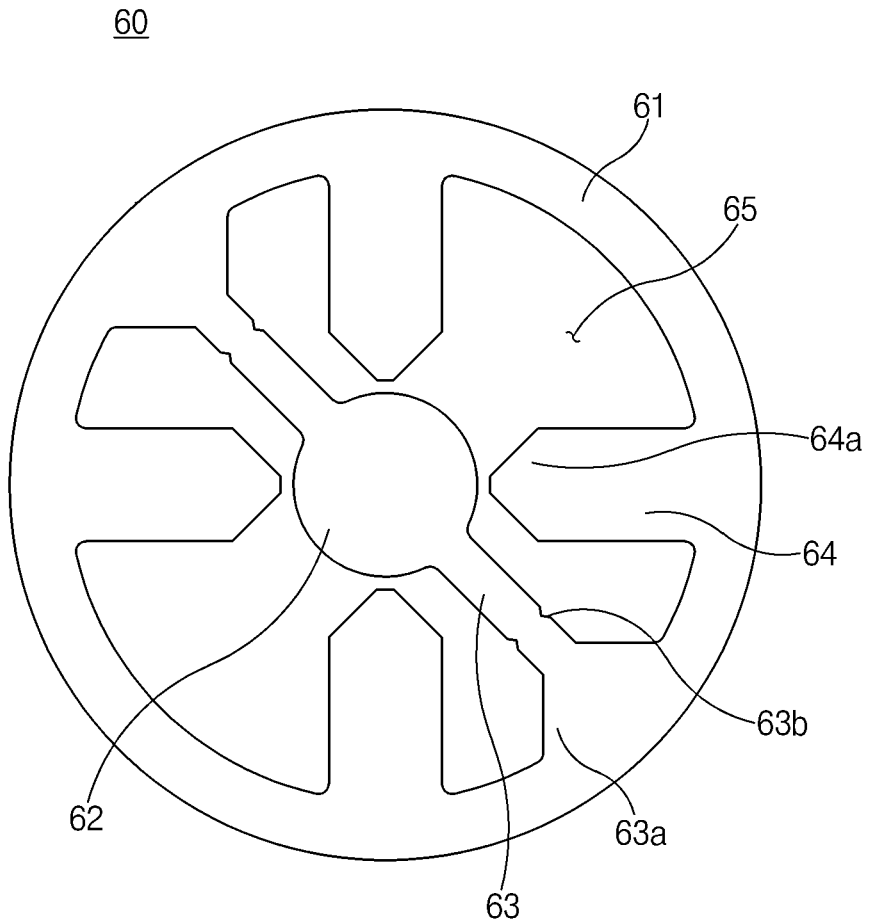
FIG. 10 is a plan view of a second collector according to another aspect of the present disclosure.

FIG. 10 is a plan view of a second collector according to another aspect of the present disclosure.

Hereinafter, contents duplicated with the previously described contents will be cited, and described with a focus on the differences.

In a second collector 60 according to the present aspect, the number of bridges 63 may be less than the number of tab coupling parts 64.

In more detail, some of the plurality of tab coupling parts 64 may be continuously disposed in a circumferential direction of the second collector 60. That is, the tab coupling parts 64 and the bridges 63 may not be alternately disposed in the circumferential direction of the second collector 60. The bridge 63 may be disposed between a pair of tab coupling parts 64 adjacent to each other in the circumferential direction of the second collector 60.

Thus, since an amount of current flowing through each bridge 63 increases, sensitivity of a narrow part 63b to overcurrent may increase. Therefore, the narrow part 63b may be ruptured more quickly, and safety of the secondary battery 1 may be improved.

The above-disclosed subject matter is to be considered illustrative, and not restrictive, and the appended claims are intended to cover all such modifications, enhancements, and other aspects, which fall within the true spirit and scope of the present disclosure.

Thus, the aspect of the present disclosure is to be considered illustrative, and not restrictive, and the technical spirit of the present disclosure is not limited to the foregoing aspect.

Therefore, the scope of the present disclosure is defined not by the detailed description of the disclosure but by the appended claims, and all differences within the scope will be construed as being included in the present disclosure.

[Description of the Symbols]

| | |
|---|---|
| 1: Cylindrical secondary battery | 10: Electrode assembly |
| 11: First electrode tab | 12: Second electrode tab |
| 20: Battery can | 21: Beading part |
| 22: Crimping part | 30: Cap plate |
| 34: Venting part | 40: Terminal |
| 41: Terminal part | 42: Body part |
| 43: Protrusion | 50: First collector |
| 51: Center part | 51a: Center hole |
| 52: Tab coupling par | 52d: Injection hole |
| 53: Can coupling part | 54: Bridge |
| 60: Second collector | 61: Edge part |
| 62: Terminal coupling part | 63: Bridge |
| 63a: Outer end (of bridge) | 63b: Narrow part |
| 63c: Cover member | 64: Tab coupling part |
| 64a: Inner end (of tab coupling part) | 65: Opening |
| 70: Spacer | 72: Sealing part |
| 80: Insulator | 81: Plate part |
| 82: Circumferential part | |

The invention claimed is:

1. A cylindrical secondary battery comprising:
   an electrode assembly having an electrode tab;
   a battery can configured to accommodate the electrode assembly therein;
   a terminal configured to pass through the battery can while being spaced from the battery can; and
   a collector configured to electrically connect the electrode tab to the terminal, the collector including:
     an edge part;
     a terminal coupling part located inside the edge part, the terminal coupling part being coupled to the terminal;
     a bridge connecting the edge part to the terminal coupling part; and
     a tab coupling part extending inward from the edge part, the tab coupling part being spaced apart from the bridge and the terminal coupling part, the tab coupling part being coupled to the electrode tab,
   wherein the bridge includes a narrow part located between opposite ends of the bridge,
   wherein at least a portion of the electrode tab is bent toward a central axis of the electrode assembly, and
   wherein the narrow part is opposite the bent portion of the electrode tab in an axial direction of the electrode assembly.

2. The cylindrical secondary battery of claim 1, wherein the bridge is provided in plurality,
   wherein the tab coupling part is provided in plurality, and
   wherein the bridges and the tab coupling parts are alternately disposed in a circumferential direction of the collector.

3. The cylindrical secondary battery of claim 1, wherein an outer end of the bridge has a width that gradually increases as it approaches the edge part.

4. The cylindrical secondary battery of claim 1, wherein the narrow part has a width corresponding to 70% to 80% of a width of the bridge at one of the ends of the bridge.

5. The cylindrical secondary battery of claim 1, wherein the narrow part is disposed closer to an outer end of the opposite ends of the bridge.

6. The cylindrical secondary battery of claim 1, wherein a distance from a center of the collector to the narrow part is 0.4 times to 0.9 times a radius of the electrode assembly.

7. The cylindrical secondary battery of claim 1, wherein the narrow part is defined by recessed grooves at opposite edges of the bridge or as a hole extending through the bridge.

8. The cylindrical secondary battery of claim 1, wherein the narrow part has a width less than a width of the bridge between the edges of the bridge.

9. The cylindrical secondary battery of claim 1, further comprising a cover member configured to surround the bridge, the cover member being made of an insulating material having thermal conductivity less than that of the bridge.

10. The cylindrical secondary battery of claim 9, wherein the cover member is made of a polyimide (PI) material.

11. The cylindrical secondary battery of claim 1, wherein the edge part has a width less than a width of the tab coupling part.

12. The cylindrical secondary battery of claim 1, wherein the collector has a radius corresponding to 33% to 102% of a radius of the electrode assembly.

13. The cylindrical secondary battery of claim 1, wherein the collector has a radius corresponding to 33% to 98.5% of an inner radius of the battery can.

14. The cylindrical secondary battery of claim 1, wherein the terminal includes a body part coupled to the terminal coupling part, and
   wherein the terminal coupling part has a radius corresponding to 40% to 320% of a radius of the body part.

15. The cylindrical secondary battery of claim 1, wherein at least one opening is defined between the edge part and the terminal coupling part, and
   wherein a ratio of a surface area of the at least one opening to a total surface area of the collector is 40% to 99%.

16. The cylindrical secondary battery of claim 1, wherein an inner end of the tab coupling part has a width that gradually decreases as it approaches the terminal coupling part.

17. A collector configured to electrically connect an electrode assembly to a terminal passing through a battery can in which the electrode assembly is accommodated, the collector comprising:
   an edge part;
   a terminal coupling part located inside the edge part, the terminal coupling part being coupled to the terminal;
   a bridge connecting the edge part to the terminal coupling part; and
   a tab coupling part extending inward from the edge part, the tab coupling part being spaced apart from the bridge and the terminal coupling part, the tab coupling part being configured to be coupled to an electrode tab provided in the electrode assembly,
   wherein the bridge includes a narrow part located between opposite ends of the bridge wherein at least a portion of the electrode tab is bent toward a central axis of the electrode assembly, and wherein the narrow part is opposite the bent portion of the electrode tab in an axial direction of the electrode assembly.

18. The collector of claim 17, wherein the bridge is provided in plurality, wherein the tab coupling part is provided in plurality, and wherein the bridges and the tab coupling parts are alternately disposed in a circumferential direction of the collector.

19. The collector of claim 17, wherein an outer end of the bridge has a width that gradually increases as it approaches the edge part.

20. The collector of claim 17, wherein the narrow part is defined by recessed grooves at opposite edges of the bridge or as a hole extending through the bridge.

21. The collector of claim 17, further comprising a cover member configured to surround the bridge, the cover member being made of an insulating material having thermal conductivity less than that of the bridge.

22. The collector of claim 17, wherein an inner end of the tab coupling part has a width that gradually decreases as it approaches the terminal coupling part.

* * * * *